INVENTOR.
C. Robert Fine

BY Darby & Darby
HIS ATTORNEYS.

INVENTOR.
C. Robert Fine
BY Darby & Darby
HIS ATTORNEYS

PERSPECTIVE SOUND SYSTEMS

Filed Oct. 8, 1953 5 Sheets-Sheet 3

INVENTOR.

C. Robert Fine

BY Darby & Darby

HIS ATTORNEYS.

Aug. 2, 1955 C. R. FINE 2,714,633

PERSPECTIVE SOUND SYSTEMS

Filed Oct. 8, 1953 5 Sheets-Sheet 4

INVENTOR.

C. Robert Fine

BY Darby & Darby

HIS ATTORNEYS

INVENTOR.
C. Robert Fine
BY Darby & Darby
HIS ATTORNEYS.

United States Patent Office 2,714,633

Patented Aug. 2, 1955

2,714,633

PERSPECTIVE SOUND SYSTEMS

Clarence Robert Fine, Tomkins Cove, N. Y., assignor, by mesne assignments, to Perspecta Sound Inc., New York, N. Y., a corporation of New York Application October 8, 1953, Serial No. 384,897

14 Claims. (Cl. 179—100.1)

The present invention relates to systems and apparatus for the control of sound-reproducing devices and is more particularly concerned with such systems of apparatus for the production of perspective or three-dimensional effects in the reproduction of sound.

At the present time, the motion picture industry is extremely active in the development and promotion of various systems for the production of three-dimensional motion pictures, particularly of the stereoscopic type. Systems are also being put into use, which, while not properly stereoscopic in character, have a three-dimensional effect by the use of extremely wide, curved screens which give the viewer an impression of depth. As a concomitant of such systems it is highly desirable to produce sound effects accompanying such motion pictures which also give the effect of a third dimension and particularly the effect of varying the origin of sound not only from side to side but also from front to back in correspondence with the action on the motion picture screen. Such effects may be termed perspective sound effects. The increased interest which can be obtained by giving the audience the feeling that the origin of sound varies in correspondence with the action occurring on the screen greatly enhances enjoyment and attracts greater attendance.

In the past, systems of this character have been utilized either with so-called three-dimensional motion pictures or with ordinary "flat" motion pictures for the above purpose. However, former known systems have the disadvantage of requiring either a separate multitrack recording in association with the usual sound motion picture film or special multiple sound tracks on the motion picture film, each track providing a separate audio signal to a respective sound reproducer. Such systems have been complicated, in requiring multiplied separate recording systems, with duplication of apparatus both at the recorder and at the record pickup or reproducer. Also, they have prevented full compatibility of the motion pictures thus produced in the sense that special films and/or records are required which can be utilized only in a motion picture theater equipped with proper apparatus and cannot be used with the conventional motion picture theater projection apparatus. This, of course, is a disadvantage where wide circulation of a motion picture print is desired, requiring one printing for inadequately equipped motion picture houses, and another different print for specially equipped houses.

It is an object of the present invention to provide a sound recording and reproducing system producing a controlled three-dimensional or perspective effect, which is useful with any form of recording medium and pickup and which provides a record fully compatible and interchangeable with conventional records and usable on conventional reproducers of the same type even though not equipped with the perspective effect.

It is a further object of the present invention to provide such apparatus using but a single track of a recording medium.

Another object of the invention is to provide means for automatically converting a perspective sound-reproducing system into a conventional system upon failure of any important part of the apparatus.

A further object is to provide a system adapted to use interchangeably perspective sound and conventional recordings on the same apparatus without change or use of adapters or converters.

The present invention provides a system which reproduces sound controllably so as to appear to be emanating from different directions and/or distances, as desired. The reproducing system incorporates a plurality of differently located loud speakers or similar sound reproducers, each of which is supplied with the same electrical sound signals picked up from a record of suitable type. A system of control is provided using only the same records and the same sound track on such record, by which the output of each of these reproducers is individually controlled as desired, according to which the different perspective effects desired can be obtained. The record produced is fully compatible and may be reproduced by conventional apparatus without producing perspective effects, or by special perspective-producing apparatus forming part of the invention.

Other objects, advantages and features of the present invention will become more fully apparent from the following description of preferred embodiments thereof, taken in conjunction with the appended drawings, in which.

Referring first to Figures 1 to 4, Figure 1 illustrates a system for producing recordings according to the present invention. As indicated above, the present invention provides in association with the usual sound or audio recording, a separate record of control signals for providing the desired perspective effect. In the system of Figures 1 to 4, Figure 2 illustrates the nature of one recording medium which might be used, in the form of a tape 11 having a pair of separated and independent tracks I and II upon which electrical signals may be impressed and recorded. These tracks I and II may be magnetic, optical, dielectric or mechanical in character, as desired. Thus for magnetic recording, tracks I and II may be strips of magnetizable material supported upon a suitable tape, such as the conventional magnetic recording tape. If optical, they would be separate visual records on respectively different areas of a film and, for example, might be of the variable-area or variable-density type utilized for the sound track of motion picture films. If mechanical, they may be embossed or engraved grooves on a suitable medium, for lateral or hill and dale recording.

Figure 1:
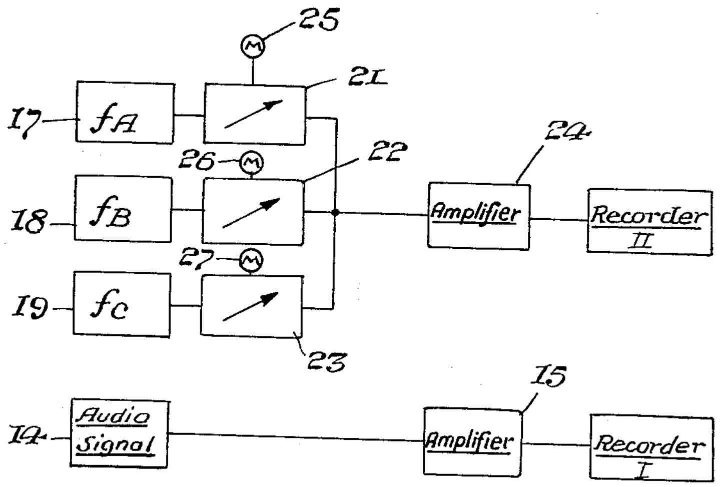
Figure 1 is a schematic block diagram of apparatus for producing both sound and control recordings according to one form of the present invention.
Figure 2:
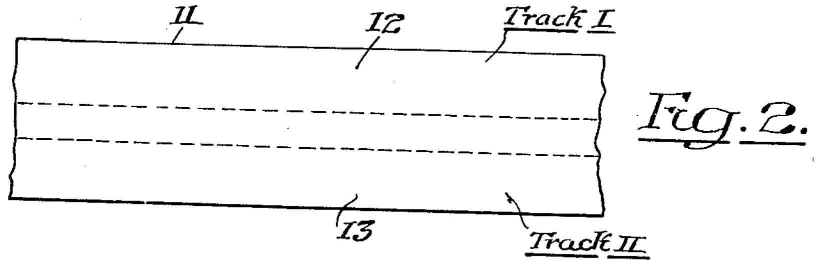
Figure 2 is a fragmentary plan view of a portion of a recording medium.

As shown in Figure 1, the recording involved is produced by respective recorders I and II arranged in well known manner to cooperate with the respective tracks I and II of the recording medium 11. The recorder I is supplied with audio signal from any source 14 of intelligence to be used, through an optional amplifier 15, so that on track I there is produced a conventional recording of the audio signal from source 14. Such audio signal may conveniently be produced by a microphone picking up a live scene or any other suitable or desired source of sound or other signals.

In addition, there are provided a plurality of control signal oscillators 17, 18 and 19 indicated in this instance and for illustrative purposes only as three in number. It will be understood that any desired number of control signals may be utilized in this system, determined by the number of controlled channels to be used. In general, there will be one control signal source for each controlled channel, such controlled channel comprising one or more sound reproducers fed by a common audio signal for producing identically varying but different intensity outputs. As indicated in Figure 1, each of the control signal sources 17, 18 and 19 produces a respective output of an individual frequency $f_A$, $f_B$ and $f_C$. By way of illustration, these frequencies may be 5, 6 and 7 kilocycles respectively or any other conveniently controlled, translated and recorded frequencies.

Each of the control signal sources 17, 18 and 19 supplies its output to an individual mixer or controller 21, 22 and 23 whereby the outputs of the individual control signal sources 17, 18 and 19 are adjustably controlled in amplitude over the desired range, and these outputs are combined into a single composite signal which is supplied through an optional amplifier 24 to the recorder II. Individual monitoring meters 25, 26 and 27 may be coupled to the mixers or controllers 21, 22 and 23 to indicate the output level of the respective control signals supplied thereto. The recorder II impresses its signal upon the track II of the recording medium 11. In this way, two separate recordings on a single medium 11 are provided, one being the normal audio or intelligence signal to be reproduced and the other being a composite control signal whose components are the respective different-frequency control signals, each individually adjusted in amplitude as desired.

Figure 3:
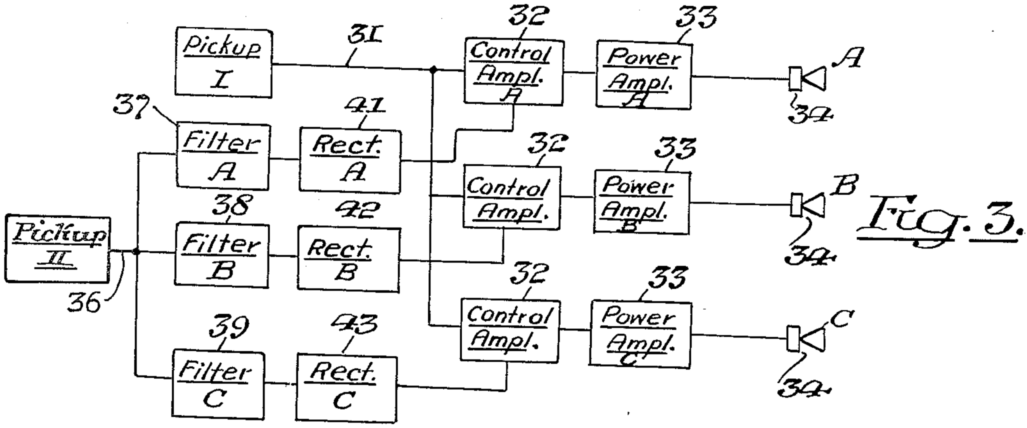
Figure 3 is a schematic block diagram of a reproducing system for the apparatus illustrated in Figures 1 and 2.

At the reproducer location, as illustrated in Figure 3, a pickup I cooperates with track I of the recording medium 11 to reproduce in lead 31 the signal recorded on track I. This signal is applied identically to a plurality of control amplifiers 32, each feeding a respective power amplifier 33, which in turn energizes a respective sound reproducer 34, such as a loud speaker or the like. In this way, a replica of the same audio signal provided by source 14 of Figure 1 is applied to all of the sound reproducers 34. These reproducers are desirably positioned at different locations about the listeners' positions. Thus, in an auditorium, theater or large room, the reproducers 34 would be distributed at the center and on either side of the area from which it is desired that the reproduced sound emanate.

For the purpose of providing the desired perspective sound effect, according to the present invention the outputs of the reproducers 34 are individually controlled by and in accordance with the respective control signals. For this purpose a second pickup II is provided which cooperates with the track II of the recording medium 11 of Figure 2 to produce on its output lead 36 a replica of the composite control signal supplied to the recorder II. This composite signal is fed to a plurality of filters 37, 38 and 39, each adapted to pass a respective one of the several control signal frequencies. Thus filter 37 is part of control channel A and passes only the control signal frequency $f_A$. Similarly, filters 38 and 39 form parts of control channels B and C respectively, and pass control signal frequencies $f_B$ and $f_C$ respectively. The filters 37, 38 and 39 have their outputs coupled respectively to rectifiers 41, 42 and 43 which convert the respective control signals of frequencies $f_A$, $f_B$ and $f_C$ into corresponding respective unidirectional control signals each preferably proportional in amplitude to its alternating control signal. These unidirectional signals are in turn supplied to the control amplifiers 32 of the respective channels A, B and C to variably control the amplitudes of the outputs of these control amplifiers, so as to correspondingly control the reproducer outputs.

The operation of this system will be more readily apparent from an illustrative example of one of its fields of usefulness, although the invention is not limited thereto. In present wide-screen and three-dimensional motion pictures the movement of visible action on the screen should desirably be accompanied by a corresponding apparent movement of sound emanating from such action. Thus, if an actor moves across the screen, his voice should appear to move with him, to enhance the audience's enjoyment and increase the illusion of actual movement. Similarly, as an actor (or source of sound or music) apparently moves away from the audience, the sound should diminish in intensity. As another example, in an orchestral performance, sound from different sections of the orchestra should appear to emanate from different sides of the audience. All these effects are readily produced by the present system, since, although audio signals of identical sound content or intelligence are supplied simultaneously to all reproducers, the actual intensity of sound from each reproducer may be individually adjusted to give the desired overall effect.

In actual use, an operator adjusts the controlling mixers 21, 22, 23 as the program is recorded, to provide the proper control signal amplitudes synchronously with the program, so that upon reproduction as in Figure 3 the perspective effect desired is produced.

Figure 4:
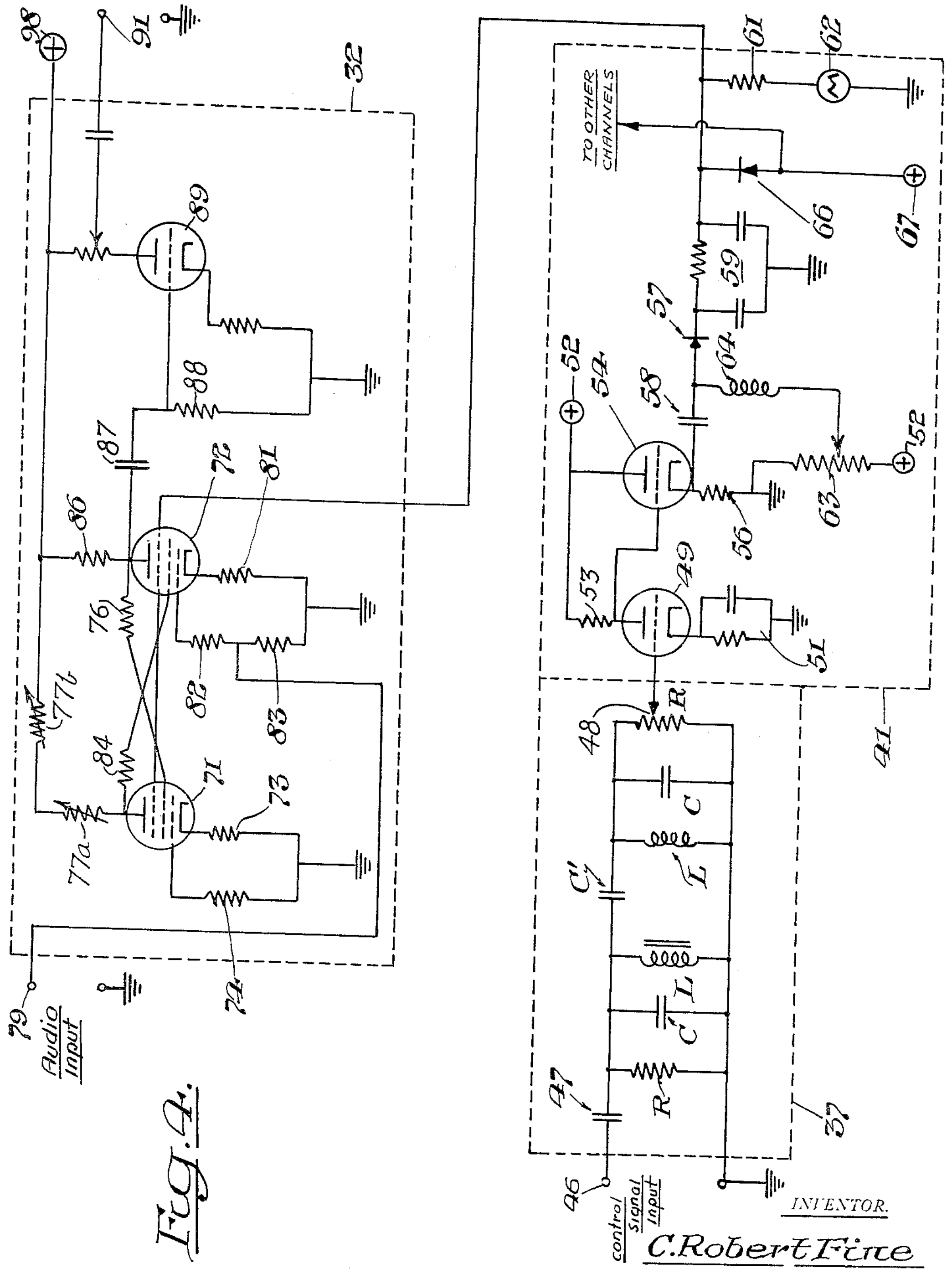
Figure 4 is a schematic circuit diagram of the filter, rectifier and control amplifier portions of the system of Figure 3.

While any conventional circuit adapted to perform the functions stated above could be used for filters 37, 38, 39, rectifiers 41, 42 and 43, or amplifiers 32, Figure 4 illustrates one form of such circuit found to be very useful in the present system.

Figure 4 illustrates any one of the channels A, B or C, taken for illustrative purposes to be channel A, and the dotted rectangles labelled 37, 41 and 32 form respectively the filter 37, the rectifier 41 and the control amplifier 32 of that channel. The input control signal from the pickup lead 36 is fed to terminal 46 of the filter 37. This filter is generally of the pi type having two shunt arms each composed of resistance R, capacitance C and inductance L, and a series arm formed by capacitance C′, the pi arrangement being coupled to the input terminal 46 through a coupling condenser 47. The output arm resistor R may be in the form of a potentiometer whose variable tap 48 is coupled to the control grid of a triode amplifier 49 having its cathode connected to ground through a parallel-connected RC circuit 51, and its anode connected to a source 52 of positive potential through a load resistor 53. The anode of tube 49 is directly coupled to the control grid of a second tube 54 whose cathode is grounded through a cathode output resistor 56 and whose anode is coupled directly to the positive potential source 52. The cathode of tube 54 is coupled to a rectifier 57 through a coupling condenser 58, the rectifier 57 having a resistor-condenser filter 59 to ground for bypassing the alternating current components of its rectified output, which is supplied to an output resistor 61 connected to ground through a current meter 62.

As thus far described, the filter 37 selects the control signal of frequency $f_A$ for amplification by tubes 49 and 54, the latter operating as a cathode follower. This amplified control signal is then rectified by rectifier 57 to appear as a correspondingly varying unidirectional signal across resistor 61. In addition, an adjustable positive bias from source 52 is supplied to the junction between rectifier 57 and its input condenser 58 by means of a potentiometer 63 and an isolating choke 64. This adjustable bias voltage determines the initial value of the unidirectional signal appearing across output resistor 61 in the absence of control signal and in effect provides a range adjustment for the reproduced sound. Also connected across resistor 61 through a further rectifier 66 is a positive potential source 67 common to all channels. This is selected to provide the same current to the resistors 61 of all channels, to provide a common zero-signal-level condition for the control amplifier individually adjustable by range adjustment 63. Source 67 may be made adjustable, so as to provide a type of ganged control for the output levels of all channels simultaneously, each channel also having its individual adjustment 63.

The arrangement of rectifiers 57 and 66 is of especial advantage in providing isolation between channels even though using common power supplies. Thus, current from source 52 cannot pass to source 67 or to other channel circuits, because of the large backward impedance of rectifier 66. Similarly, no current from source 67 can pass to source 52 because of the backward impedance of rectifier 57. Therefore the adjustment of any one channel has no effect on other channels.

The control amplifier 32 comprises a pair of amplifier tubes 71 and 72 preferably of the multiple grid type. Tube 71 has its cathode connected to ground through a cathode resistor 73 and its first grid is also connected to ground through a resistor 74. The second grid of tube 71 is connected through a resistor 76 to the anode of the other tube 72. The third grid of tube 71 is directly connected to the corresponding third grid of tube 72 and both of them are connected to the high potential terminal of rectifier output resistor 61. The anode of tube 71 is connected through variable load resistances 77*a*, 77*b* to a positive potential source 98. Tube 72 has its cathode grounded through a cathode resistor 81 and its first grid is also connected to ground through a voltage divider formed by resistors 82 and 83 whose junction is connected to the input terminal 79 to which the audio signal is supplied from lead 31 of Figure 3. The second grid of tube 72 is connected through a resistor 84 to the anode of the first tube 71. The anode of tube 72 is connected through a load resistor 86 to the positive potential source 78. This crisscross-connected two-tube circuit operates as a variable gain amplifier whose amplification is determined by the bias on the third grids as supplied from the rectifier load resistor 61. In this way, the unidirectional voltage appearing across resistor 61 determines the amplification of the audio signal applied to terminal 79. The slope of the gain charactertistic of the circuit of tubes 71, 72 is not linear, so that the adjustable bias provided by range adjustment 63 determines the actual range or change in amplitude of audio which a given amplitude of control signal will produce.

This variably controlled output of tube 72 is supplied through a coupling condenser 87 and an input resistor 88 to a further amplifier stage 89 of conventional form whose output is supplied to the terminal 91 coupled to the input of power amplifier 33 of Figure 3.

It will be appreciated that by this circuit the gains of the respective control amplifiers 32 are individually determined by the amplitudes of the respective control signals so as to govern the sound output level from the respective reproducers 34. In this way, by properly determining the amplitudes of the control signals set into the recording system of Figure 1, any desired sound arrangement or perspective effect can be produced by the reproducing system of Figure 3. Thus, if the reproducers of A, B and C represent respectively the left, center and right loud speakers in a theater, by properly producing the amplitudes of control frequencies $f_A$, $f_B$ and $f_C$ the sound may seem to come from the left, center or right portions of the auditorium. Thus with control signal $f_A$ at maximum amplitude and control signals $f_B$ and $f_C$ at zero amplitude, the sound will issue only from loud speaker A, with full volume, and it will appear to come from the position of the loud speaker A, such as the left side of the theater. By varying the amplitude of the control signal $f_A$ varying distance effects can be obtained and the sound source may appear to be closer or farther as desired. Similarly, by having control signal $f_C$ of maximum amplitude and the others at zero and with reproducer C at the right side of the theater, the sound comes only from the right side. By gradually decreasing the amplitude of $f_A$ as that of $f_C$ increases, the sound may be made to shift from left to right. The center channel can be coordinated with the others to give intermediate effects. It will therefore be obvious that by controlling the relative amplitudes of the respective control signals, the resultant sound reproduced can be made to shift in direction and may be made to appear to come closer or go farther from the listener.

By use of the present system, the normal effect of a motion picture, for example, can be greatly enhanced. As actors speak from the left or right side of the screen, the sound can shift correspondingly. As actors move forward or back on the screen, the volume of sound can vary correspondingly to give an auditory illusion corresponding to the visual effect, thereby greatly enhancing the realism and enjoyment of the observer.

It will be understood that the above system and the other systems described herein below are in no way limited to use with motion pictures or in motion picture systems. On the contrary, such systems can be utilized wherever perspective sound reproduction is desired. For example, in recording and reproducing orchestral compositions and particularly symphonic compositions, listening pleasure can be increased by the addition of perspective sound effects. Thus, where in the customary symphonic orchestra different sections of the orchestra are usually positioned at different locations, by the use of perspective sound effects according to the present invention and with a plurality of sound reproducing devices, portions of the composition emanating from a particular section of the orchestra can be made to appear to come from a direction corresponding to the location of that section of the orchestra. Thus if the string section is on the right side and other sections such as the woodwinds on the left, portions of the composition in which the strings predominate can be made to appear to emanate from reproducers on the right side of the room and, similarly, the woodwind sections of the composition can be made to appear to emanate from the left side, thereby giving the illusion of directional and perspective effects which will enhance the customary "flat" reproduction. Also, special or unusual sound effects can be created at will. Eerie effects can be obtained, for example, by having the apparent sound source travel around a room or theater, from side to side, or front to rear. This can be used as special sound effects in the theater or for other purposes.

It will be also understood that the recording medium used in any of the forms of the present invention need not be in the form of a tape or film, but can be any other suitable recording medium where desired including wire, disc, cylinder or the like, provided that in the above form of the invention two separate tracks are available either on the same physical medium or equivalently so by physical synchronization of two separate physical media, to have the intelligence and control signals synchronously recordable.

Figure 5:
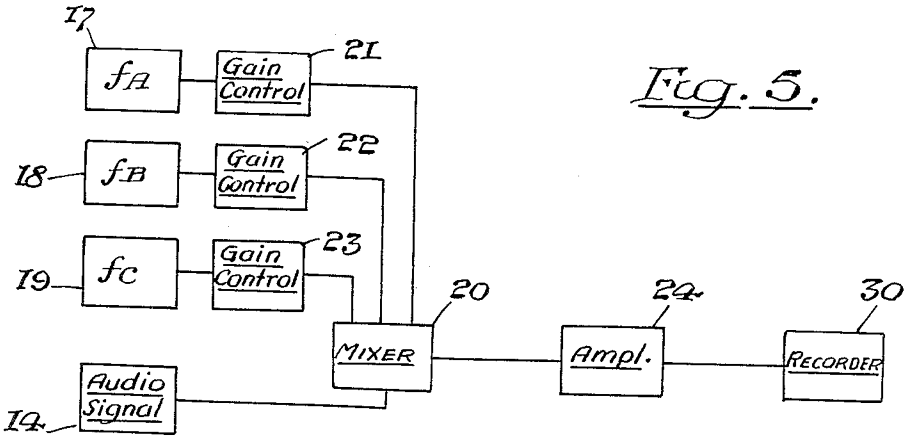
Figure 5 is a schematic block diagram of a modified form of recording apparatus using a single recording track.
Figures 6, 7:
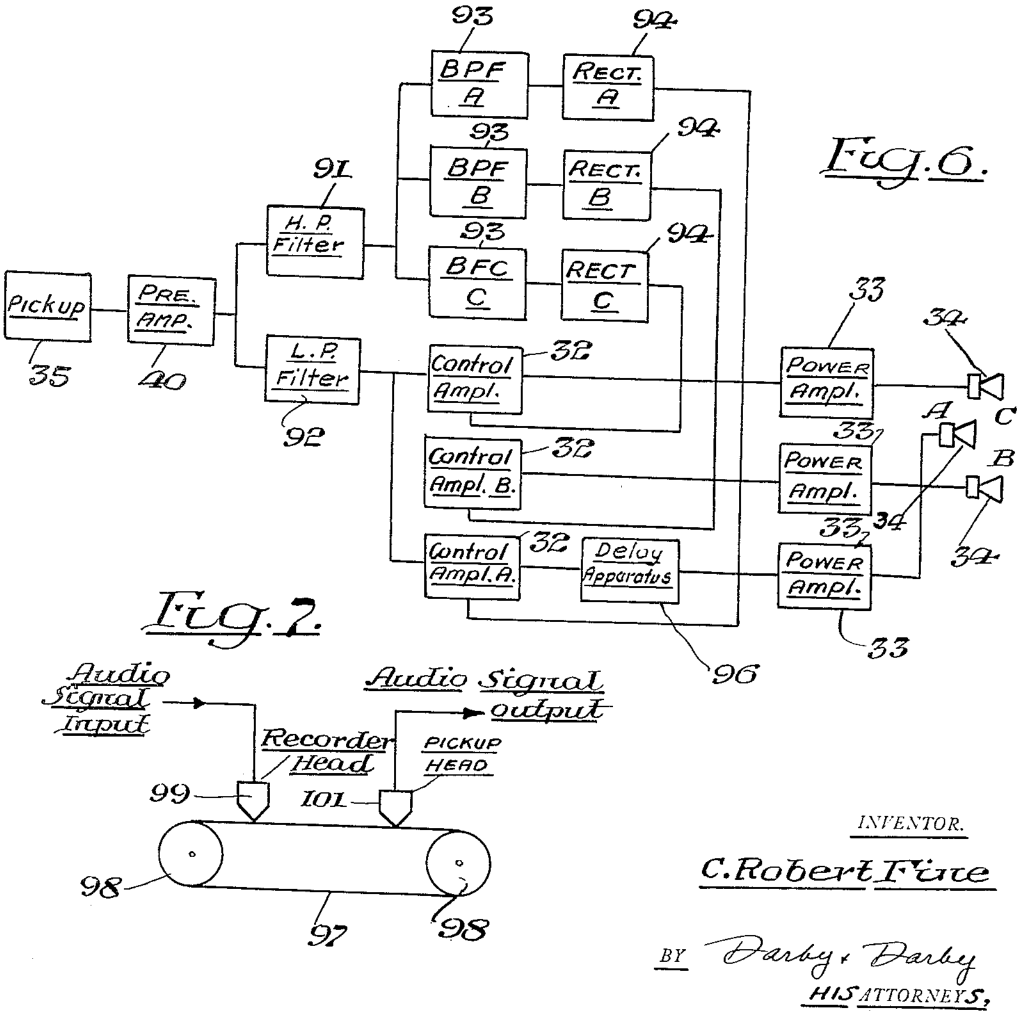
Figure 6 is a schematic block diagram of a modified form of reproducing apparatus useful in connection with the recording apparatus of Figure 5 and including the addition of reverberation apparatus.
Figure 7 is a schematic diagram of one form of reverberation apparatus.

In many situations and particularly where full compatibility of perspective sound systems with conventional systems is desired the use of two separate sound tracks may be disadvantageous. Thus, where it is desired that the same record, whether disc, tape, film, etc., be usable both with systems equipped with multiple reproducers for perspective sound effects as in the present invention, and with conventional systems not so equipped, the use of two separate sound tracks may prevent full compatibility of such records both with conventional and perspective sound reproducing systems. According to other aspects of the present invention, it can be applied to single sound tracks without materially increasing the relative complexity of the system, and providing full compatibility with conventional reproducers. Figures 5 to 7 illustrate one form of single track system. It will be understood that the control signal frequency values illustratively given above, namely, 5, 6 and 7 kilocycles per second, might be undesirable for single track operation since there may be confusion between the intelligence portion of the recorded signal and the control portion of that signal. Preferably, therefore, for single track operation the control frequency values are selected to be outside the range of frequencies employed for the intelligence involved. For example, in the examples of Figures 5 to 7, an intelligence band of up to 10 kc. may be employed, with control frequencies between 11 and 15 kc., or the like.

As shown in Figure 5, representing the recording apparatus of the system, the control frequency sources 17, 18 and 19 have their outputs supplied through respective gain controls 21, 22 and 23 similar to Figure 1, to a mixer 20 to which is also supplied the audio intelligence signal from source 14. As before, each of the gain controls 21, 22 and 23 may be independently adjusted simultaneously with the recording of the audio signal from source 14 to determine the control signal amplitude for each of the control signals according to the desired effect to be produced. The output of mixer 20 is supplied to an optional amplifier 24 and thence to the recorder 30 as before. The recorder 30 is but a single recorder, which may be of any conventional type such as magnetic, optical, dielectric or mechanical (i. e., embossed or grooved) to produce a record of both the intelligence and control signals upon a single recording medium, which might be a magnetic tape, a magnetic wire, an optical film such as motion picture film, a grooved cylinder, a grooved tape or the grooved disc, a grooved tape or the like, it merely being required that the recording medium and recorder have the adaptability of providing an actual recording of the combined frequency band of the audio signal of the intelligence and the control signals.

At the reproducer a suitable pickup 35 cooperating with the particular recording medium used has its output amplified in a suitable preamplifier 40, whose output is then supplied to both a high pass filter 91 and a low pass filter 92 which separate the control signals from the audio or intelligence signals in well known manner. The output of the high pass filter 91 is supplied to a plurality of band-pass filters 93 each adapted to pass only one respective control frequency. The outputs of band-pass filters 93 are supplied to respective rectifiers 94 which convert the respective control frequency signals into unidirectional control signals of individually corresponding amplitude as in the case of Figures 3 and 4. The outputs of rectifiers 94 are supplied respectively to the control amplifiers 32 which are supplied from the output of low pass filter 92. The control amplifiers 32 for certain of the channels such as channels B and C in the example used, are coupled through respective power amplifiers 33 to reproducers 34. The output of channel A and its control amplifier 32 is supplied to a delay apparatus 96 and thence to a respective power amplifier 33 and reproducer 34. The purpose of this delay apparatus 96 is to provide a time delay for the audio signal passing through channel A which, upon reproduction, produces a reverberation effect providing a further enhancement of the perspective sound effects produced. The delay apparatus 96 may be as illustrated in Figure 7, comprising an endless magnetic tape loop 97 continuously rotated over reels or pulleys 98 at constant speed. The audio signal output from control amplifier 32A is supplied to a recorder head 99 which impresses a recording of the signal on the tape 97. A pickup head 101 picks up the recorded signal and converts it into the same audio signal, but after a time delay corresponding to the length of time taken for any one spot of the tape to travel around the loop from the recorder head 99 to the pickup head 101. This time may, of course, be made adjustable by suitable means, as by varying the speed of the tape 97 or the separation between the heads 99 and 101.

Accordingly, as before, the several spatially distributed sound reproducers 34A, 34B and 34C are independently controlled by their respective control signals to provide a perspective sound effect. The reproducer 34A may be centrally located if desired, and produces an additional reverberation effect by being supplied with the time delayed version of the intelligence signal. It will be understood that as many channels and corresponding spatially distributed reproducers may be used as desired. Usually, there will be center, left and right reproducers, for example, all on stage or behind the motion picture screen of a theater, which may be supplemented by left and right side and even rear reproducers in the auditorium itself. The reverberation channel may also be multiplied by use of several spatially separated reproducers individually controlled. In the usual case, four channels suffice, one being for reverberation and the others for spatial effect as above.

One important feature of the system just described is its complete compatibility with conventional systems utilizing a single pickup operating a single reproducer. For this purpose the inputs to the mixer 20 are so arranged that the control signals have an amplitude markedly less than that of the audio signal. An amplitude ratio of 18 to 30 db may be usefully employed. At the reproducer of Figure 6 this relative diminution of the control signals can be made up by amplifiers incorporated in either the high pass filter 91, the band-pass filters 93 or the rectifiers 94 to provide a useful level of control signal output from rectifiers 94. However, in a conventional system reproducer, in which the combined control and audio signals are supplied together to the same reproducer the control signals will be substantially undetectable in the reproduced output because of their relatively low amplitude, when picked up and amplified in the conventional apparatus in which there is substantially no selectivity of amplification as between different frequencies within its range. Furthermore, conventional sound systems rarely have the capacity to amplify or reproduce frequencies above eight to ten kilocycles and in such systems, the control signals will be completely suppressed and will have no effect.

Accordingly, by the present system a recording can therefore be made which appears to be of completely conventional form and when reproduced on conventional apparatus conveys the conventional results. The same recording, however, since it contains the control frequency components, can be performed on special perspective sound equipment such as shown in Figure 6, and will produce the full enhancement offered by perspective sound. This can be extremely important, for example, in motion picture exhibition in which for economic reasons the smaller theaters comprising, of course, the larger number of theaters, may not be able to install perspective sound equipment as larger theaters can. The motion picture producer when using the present system need not concern himself over whether or not a particular theater has perspective sound equipment, since the same motion picture print having but a single sound track can be used in all theaters, those without perspective sound equipment reproducing conventional sound, and those with perspective equipment producing perspective sound effects.

In motion picture work particularly, it is often disadvantageous to record on the film and to reproduce higher frequencies in the audio range, and conventionally the optical sound track on the film contains no frequency components higher than 7500 cycles. In such case the control frequencies may be made to have values in the sub-audible range of the amplifying reproducing system, which conventionally cuts off all signals below 70 cycles. Accordingly, control frequencies between 30 and 50 cycles may advantageously be used, which will not be reproduced by the conventional amplifiers and reproducing equipment used but which can be preamplified and separated from the intelligence signal without difficulty. Here again, full compatibility is obtained by lowering the control signal level as recorded to nearly the threshold of hearing in the conventional reproducing system.

Figure 8:
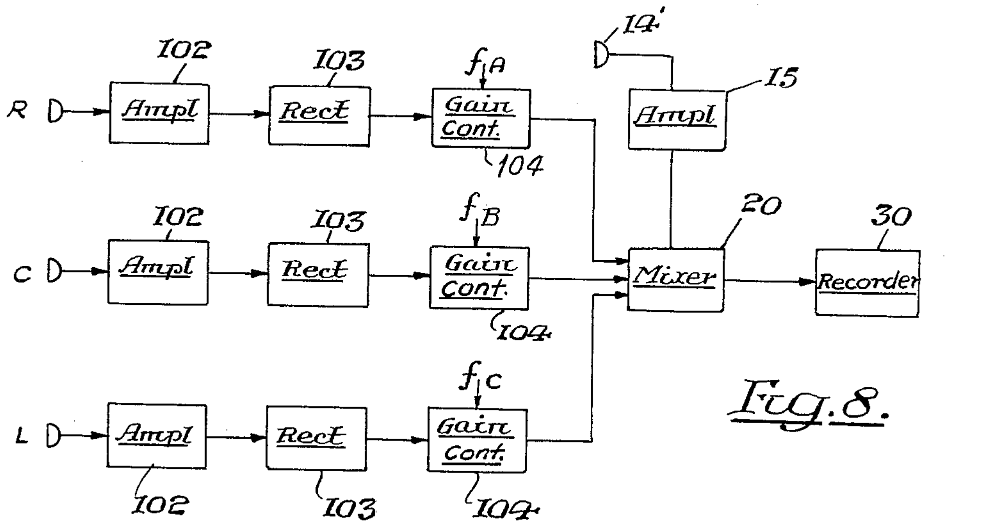
Figure 8 is a schematic block diagram of an automatically controlled recording apparatus for single track systems.

The above systems have been based upon the manual adjustment of the amplitudes of the control signals to produce desired effects. This would usually be done by manually operated gain controls 21, 22 and 23 during the recording of the audio signal, to produce control signals corresponding to the desired effects and synchronized with the audio signal. Figure 8 illustrates an automatic control system for the control signals during the recording. Thus, for example, if the audio signal represents a dramatic production or an orchestral production occurring over a considerable area, separate pickups such as microphones R, C and L may be located respectively at the right, center and left portions of the program area. The signals thereby picked up may be amplified by respective amplifiers 102, rectified by rectifiers 103 and supplied to adjustable gain control amplifier circuits 104 which are also supplied with the respective control signals $f_A$, $f_B$ and $f_C$. The rectifiers 103 and control amplifier circuits 104 may be of the type illustrated in Figure 4 or may be of other conventional types, by which the output of control frequency has an amplitude determined by the average microphone output. In this way, the average intensity of sound picked up by each of the microphones R, C, and L produces a respective control signal of corresponding amplitude. At the same time a further pickup 14′ such as a microphone, picks up the audio signal which is supplied through an amplifier such as 15 to a mixer 20 to which are also supplied the outputs of the control amplifier circuits 104. The mixer output then proceeds to the recorder 30 as before. By using the reproducing system of Figure 6 or those described hereafter, perspective effects are produced which correspond more closely to and simulate the original program, providing a directional and perspective output simulating that of the original program when the respective reproducers are arranged at the right, center and left of the room or theater in which the program is reproduced.

Figure 9:
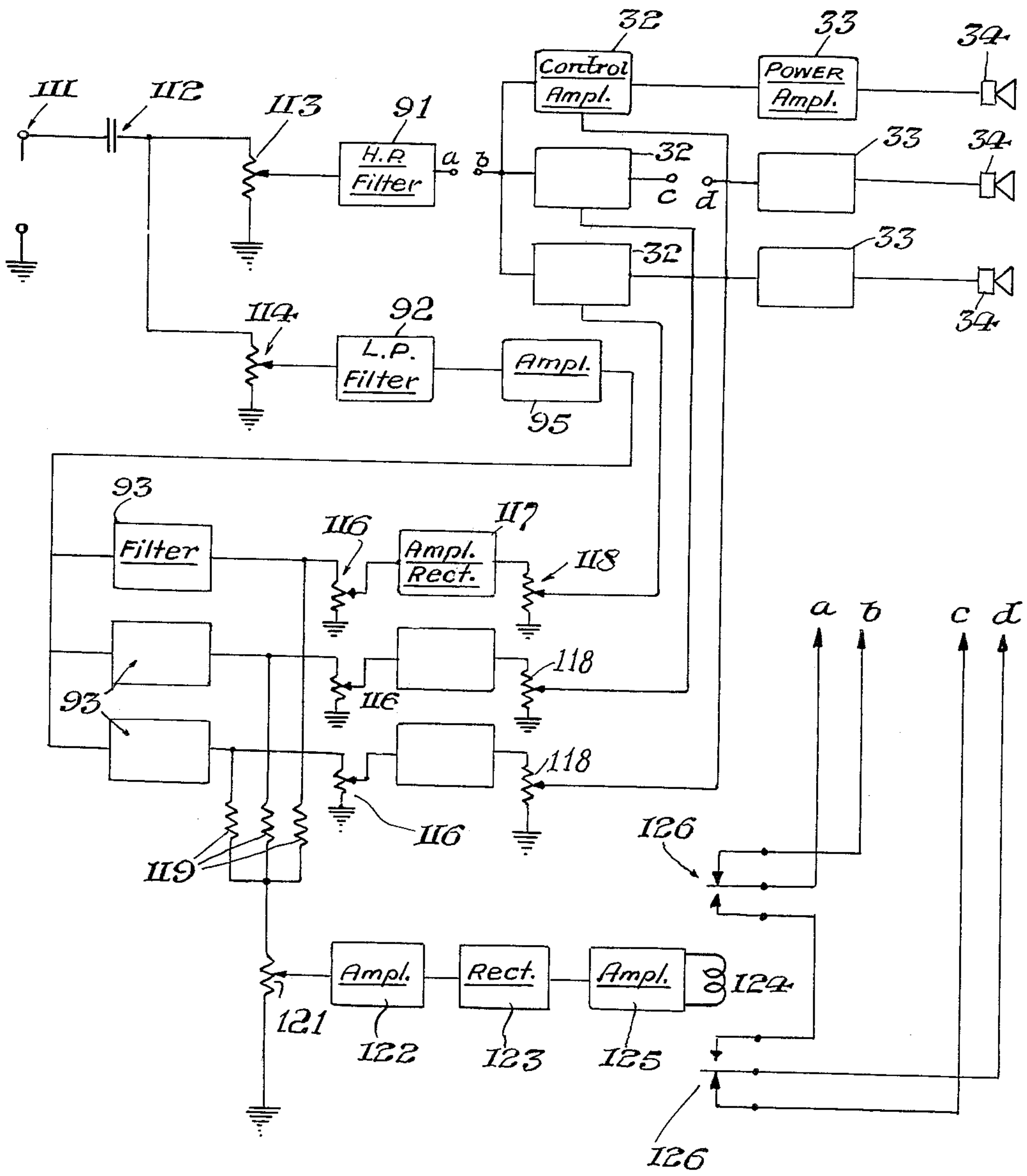
Figure 9 is a schematic block diagram of an improved form of reproducing apparatus according to the present invention.

In systems of the above type, such as shown in Figs. 1, 3, 5, 6 or 8, should there be a failure in any channel, the net effect would be a considerably distorted perspective sound effect. It would be much preferable to have a conventional flat sound system rather than such a distorted perspective sound system. According to a further feature of the present invention, illustrated in Figure 9 as applied to a sub-intelligence control frequency system, means are provided for automatically switching the present system over from a perspective sound system to a conventional sound system upon failure of any of the control channels or absence of all control signal. In this figure, elements which are the same as in previous figures have been given the same reference characters.

The composite audio and sub-audible control signal derived from a suitable pickup unit and/or amplifier, not shown, is applied to input terminal 111 from which it proceeds through a coupling condenser 112 to a gain control 113, supplying the high pass filter 91 which in turn feeds the control amplifiers 32, power amplifiers 33 and reproducers 34. Also coupled to the condenser 112 is a control signal amplitude control 114 at the input to the low pass filter 92, coupled through an optional amplifier 95 to the band pass filters 93 each adapted to pass a respective sub-audible control frequency. At the output of each filter 93 is an expansion control 116, coupled to an amplifier and rectifier 117, having a gain control 118 in its output for adjusting the level of the unidirectional control signal applied to the control amplifiers 32. Also coupled to the outputs of filters 93 through respective isolating resistors 119 is a carrier alarm sensitivity control 121 supplying an amplifier 122 whose output is supplied to a rectifier 123 controlling a relay 124 through amplifier 125. As will be seen, the relay contacts 126 upon energization of relay 124 serve to interrupt the line at the points $a$, $b$ in the output of the intelligence-passing filter 91 and connect the output of the intelligence-passing filter 91 directly to the center power amplifier channel 33, supplying the center reproducer 34. The other reproducers 34 are then not energized by the audio intelligence signals.

Figure 10:
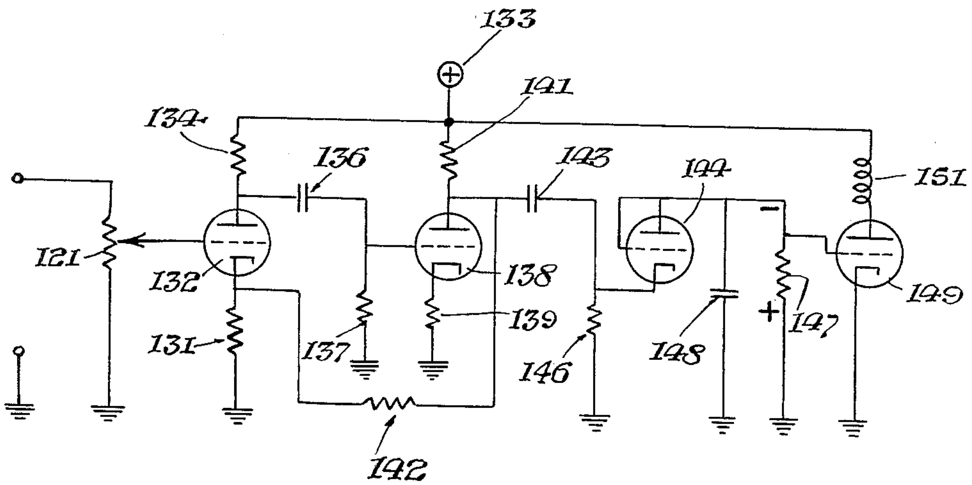
Figure 10 is a schematic circuit diagram of the fail-safe control circuit in the system of Figure 9.

The circuit of the amplifier 122, rectifier 123, amplifier 125 and relay 124 is shown in Figure 10. The sensitivity control or potentiometer 121, has its variable tap coupled to the grid of an amplifier tube 132 whose cathode is grounded through resistor 131 and whose anode is coupled to a positive potential source 133 through a load resistor 134. The anode of tube 132 is coupled by a condenser 136 and input resistor 137 to the grid of an amplifier tube 138, whose cathode is grounded through resistor 139 and whose anode is coupled to the source 133 through a load resistor 141. The anode of tube 138 is coupled to the cathode of tube 132 through a negative feed-back resistor 142, preventing oscillation, and is also coupled through a condenser 143 to the cathode of a diode rectifier 144 by way of an input resistor 146. The anode of diode 144 is coupled to ground through a load resistor 147 having a shunt condenser 148. The load resistor 147 is coupled between the cathode and grid of a relay control tube 149, having the relay winding 151 connected between the source 133 and its anode.

The resistors 119 serve to combine the outputs of filters 93 into a composite control signal appearing across the sensitivity control potentiometer 121. Where desired, the sensitivity control 121 could be coupled directly to the output of filter 92 or amplifier 95; however, it is more desirably coupled as shown so that failure of any part of the circuit of filter 92, amplifier 95 or filters 93 may actuate the auto-switching or fail-safe system. The amplifier 122 formed by tubes 132 and 138 increases the level of this composite control signal which is then rectified by the rectifier 144 and applied to the relay tube 149. The relay tube 149 is normally cut off, leaving the relay de-energized. In this position, points $a$ and $b$ are connected together by upper relay contacts 126, and points $c$ and $d$ are similarly connected by lower contacts 126. Should the composite control signal diminish below a predetermined value determined by the setting of the sensitivity control 121, the voltage developed across the rectifier 147 will diminish, thereby reducing the negative bias for tube 149 and causing current to be drawn through the relay winding 151 to actuate the relay. Upon energization of relay 124, its contacts open $a$ and $b$, open $c$ and $d$, and connect $a$ to $d$, thereby supplying audio only to the center channel power amplifier 33, cutting out all other channels and control amplifiers 32.

Since during normal operation there would always be at least one reproducer in operation requiring at least one control signal to be of appreciable and more than minimum amplitude, during such normal operation the relay 124 is normally kept deactivated, permitting normal perspective sound operation. Should any one of the control signals fail, or be absent when it should be present, or should any of the control channel circuits fail, the composite control signal will diminish, resulting in control action whereby the audio input of the three variable-gain control amplifiers 32 is cut off from intelligence-passing filter 91 and is supplied solely to the center channel power amplifier 33, thereby resulting in flat reproduction during the period that the control signal is of improper amplitude.

This fail-safe or auto-switch feature is of particular importance with respect to motion picture reproduction. As indicated above, motion picture films having a sound track produced according to the present invention may operate either with a perspective sound reproducing system or a conventional reproducing system, interchangeably and compatibly. Conversely, it is important that a perspective sound reproducing system be able to reproduce interchangeably and compatibly motion picture films with conventional sound tracks as well as those with perspective sound tracks. The auto-switch feature just described assures this. For example, if a conventional news reel film or short subject is spliced onto the same film with a perspective sound track, upon projection of the conventional film portion, there will be a complete absence of control signal. This will automatically operate the auto-switch circuit to switch the reproducing system over to the conventional flat system using merely the central reproducer. If desired, of course, instead of merely using the central reproducer, further relay contacts on relay 124 could supply the audio signal under these circumstances directly to all of the power amplifiers, producing uniform amplitude and distributing sound uniformly from all the reproducers. This, however, may be distracting where some of the reproducers are not located behind the screen as in conventional systems, but may be located within various other parts of the theater.

It is to be noted that where sub-intelligence control frequencies are used, it is important to avoid interference between the intelligence signal and the control signals. The provision, according to one feature of the present invention, of a marked amplitude distinction between these signals, whereby the control signals are at least 18 and preferably about 30 db below the intelligence signal level, assists in avoiding such interference. Also, according to another feature of the present invention, interference is avoided by using substantially pure sinusoidal control signals, thereby minimizing harmonic interference. In addition, changes in control signal are made only relatively slowly, to minimize side band effects, and intermodulation is avoided both by the wide level discrepancy and by use of substantially linear circuits.

Accordingly, the present invention has provided a system for producing perspective sound effects by the use of a plurality of spatially separated reproducers, each supplied with the same audio signal and individually controlled as to output amplitude by control signals recorded together with the audio signal upon a single sound track, the system being directly completely compatible with its recordings being usable with conventional single-channel sound reproducing systems without requiring any adaptation, modification or conversion.

It will be understood that many variations of the above illustrative systems are possible without departing from the spirit of the present invention. Thus, any desired types of amplifiers, filters, rectifiers, relay-control circuits or adjustable-gain circuits may be used, as convenient, in place of those indicated above.

Also, in place of making a recording of the composite control plus audio signal and then reproducing it, that composite signal may be transmitted directly to a reproducer system, as by wire or radio links, to give perspective sound at a distance substantially simultaneously with the creation of the program.

Also, in place of control signals of different frequencies, adjustable in amplitude, these signals may be either of different frequencies, adjustable in phase, or of different phase, adjustable in amplitude, or of different amplitudes, adjustable in frequency or phase, so long as in each case they are separable and a variable control effect can be derived therefrom.

Accordingly, the above description is intended to be illustrative only, the present invention being defined only by the appended claims.

I claim as the invention:

1. A system for producing perspective sound effects from a recording medium having a single recording track with a composite signal recorded thereon having an audio intelligence signal component and a plurality of control signal components, the amplitude of said control signal components being at least 18 decibels below that of said audio signal component, said system comprising a single pick-up adapted to derive from said recording medium electrical signals representative of said composite signal and having said audio and control signal components, a plurality of spacially segregated sound reproducers, means supplying said audio signal component to all said reproducers with identical wave forms, means for controlling the output of each of said reproducers in correspondence with a respective control signal whereby perspective sound effects are produced in accordance with said control signals, and for causing said audio signal component to be supplied only to a predetermined number of said reproducers and with an amplitude independent of said control signals in response to a value of a resultant of the levels of said control signal components below a predetermined value, whereby said system is rendered substantially fail-safe.

2. A system for producing perspective sound effects from a composite signal having an audio intelligence signal component and a plurality of control signal components having amplitudes representative of desired respective amplitudes of sound from a plurality of spaced points comprising a plurality of sound reproducers respectively located at said spaced points, means supplying said audio signal components to all said reproducers, means for controlling the amplitude output of each of said reproducers in correspondence with a responsive control signal, and for causing said audio signal component to be supplied only to a predetermined number of said reproducers and with an amplitude independent of said control signal components in response to a value of a resultant of the levels of said control signals below a predetermined value, whereby said system is rendered substantially fail-safe.

3. A system for producing perspective sound effects from a single track record having recorded thereon an audio signal component and a plurality of control signal components respectively representing desired intensities of sound from an arrangement of spaced points, said system comprising means for reproducing said audio and control signal components from said record, a plurality of sound reproducers distributed at spaced points in accordance with said arrangement, means for supplying said audio signal component with the same wave form to all said reproducers, means for controlling the output of each of said reproducers in accordance with a respective control signal component, and for causing said audio signal component to be supplied only to a predetermined number of said reproducers and with an amplitude independent of said control signal components in response to values of a resultant of the levels of the said reproduced control signal components below a predetermined value, whereby said system is rendered substantially fail-safe.

4. A system for producing perspective sound effects from a single composite signal having an audio signal component and a plurality of control signal components respectively representing desired intensities of sound from an arrangement of a plurality of spaced points, said system comprising a plurality of sound reproducers distributed at spaced points in accordance with said arrangement, means for supplying said audio signal component to all said reproducers, means for controlling the output of each of said reproducers in accordance with the amplitude of a respective control signal component, and for causing said audio signal component to be supplied only to a predetermined number of said reproducers and with an amplitude independent of said control signal components in response to the attainment by a resultant of the levels of said control signal components of a value below a predetermined value, whereby said system is rendered substantially fail-safe.

5. A system for producing perspective sound effects from a single composite signal having an audio signal component and a plurality of control signal components respectively representing desired intensities of sound from an arrangement of a plurality of spaced points, said system comprising a plurality of sound reproducers distributed at spaced points in accordance with said arrangement, means for supplying said audio signal component to all said reproducers, means for controlling the output of each of said reproducers in accordance with the amplitude of a respective control signal component, and for causing said audio signal component to be supplied only to a predetermined number of said reproducers and with an amplitude independent of said control signal components in response to a predetermined collective condition of said control signal components.

6. A circuit responsive to a single composite signal having an audio program component and a plurality of control signal components respectively representing desired amplitudes of audio program reproduction from a plurality of spaced points, said control signal components having separate frequencies outside the intended range of reproduction of said program component, for deriving from said composite signal a plurality of versions of said program component having identically the same program content but having respective amplitudes corresponding to the amplitudes of said control signal components, said circuit comprising a single input channel for receiving both said program component and said control signal components, a pair of filters for separating said program component from all of said control signal components, a plurality of control amplifiers, means supplying each of said amplifiers with said same separated program component, a plurality of filters for segregating said control signal components one from another, a respective rectifier coupled to the output of each of said latter filters for producing a direct current signal representative of the amplitude of its respective control signal, means for controlling the gain of each of said amplifiers by a respective one of said direct current signals, whereby the program signal output from each said amplifier has an amplitude corresponding to a respective one of said control signal components, and for disabling said control amplifiers and for causing said separated program signal component to bypass a predetermined number of said control amplifiers in response to a predetermined condition of said control signal components.

7. A circuit responsive to a composite signal with both an audio program component and a plurality of control signal components respectively representing desired intensities of reproduction of said audio program at a plurality of spaced points, for deriving from said composite signal a plurality of versions of said audio program having the same program content but with respective amplitudes corresponding to respective ones of said control signal components, said circuit comprising a single input channel for receiving both said program and control signals components, means for separating said program and control signal components, a plurality of control amplifiers each adapted to be supplied with said separated program component, and means for controlling the gain of each of said amplifiers by a respective one of said control signal components, whereby the program signal output from each said amplifier has an amplitude corresponding to a respective one of said control signal components, means additively combining said control signal components to provide a control signal component resultant and means for causing at least one of said program signal outputs to be rendered independent of the amplitude of its respective control signal component in response to said resultant attaining values below a predetermined level, whereby said circuit is adapted to continue desired operation upon failure or absence of said control signal components.

8. A circuit responsive to an audio program signal and a plurality of control signals respectively representing desired intensities of reproduction of said audio program at a plurality of spaced points, for deriving a plurality of versions of said audio program having the same program content but with respective amplitudes corresponding to respective ones of said control signals, said circuit comprising a plurality of channels each adapted to be supplied with said audio program signal, means for controlling the output of each of said channels by a respective one of said control signals, whereby the program signal output from each said channel has an amplitude corresponding to a respective one of said control signals, and means for causing at least one of said program signal outputs to be rendered independent of said control signal components in response to a predetermined condition of said control signal components.

9. A circuit responsive to a single composite electrical signal having both an audio program component and a plurality of control signal components respectively representing desired amplitudes of reproduction of said audio program at a plurality of spaced points, for deriving from said composite signal a plurality of versions of said audio program component having substantially the same wave form but with respective amplitudes corresponding to respective ones of said control signal components, said circuit comprising means for deriving said program and control signal components from said composite signal, a plurality of program signal channels each adapted to be supplied with said derived program component, means for controlling the output of each of said channels by a respective one of said control signal components, whereby the program signal output from each said channel has an amplitude corresponding to a respective one of said control signal components, and means for causing at least one of said program signal outputs to be rendered independent of said control signal components in response to a predetermined collective condition of said control signal components.

10. A circuit responsive to an audio program signal component and a plurality of control signal components respectively representing desired amplitudes of reproduction of said audio program at a plurality of spaced points, for deriving a plurality of versions of said audio program signal component having substantially the same wave form but with respective amplitudes corresponding to respective ones of said control signal components, said circuit comprising a plurality of control amplifiers each adapted to be supplied with said program signal component, means for controlling the gain of each of said amplifiers by a respective one of said control signal components, whereby the program signal output from each of said amplifiers has an amplitude corresponding to a respective one of said control signal components, and means for causing at least one of said program signal outputs to be rendered independent of said control signal components in response to a predetermined collective condition of said control signal components.

11. A circuit responsive to an audio program signal and a plurality of control signals respectively representing desired amplitudes of reproduction of said audio program at a plurality of spaced points, for deriving a plurality of versions of said audio program signal having substantially the same wave form but with respective amplitudes corresponding to respective ones of said control signals, said circuit comprising a plurality of control amplifiers, each adapted to be supplied with said audio program signal, means for controlling the gain of each of said amplifiers by a respective one of said control signals whereby the audio program signal output from each said amplifier has an amplitude corresponding to the amplitude of a respective one of said control signals, means for producing a further signal having an amplitude corresponding to the sum of the amplitudes of said control signals, and means for causing at least one of said program signal outputs to be rendered independent of said control signals in response to values of said further signal below a predetermined level.

12. A circuit as in claim 11, wherein said last-named means comprises relay means responsive to said further signal for interrupting said amplifier outputs and for supplying said program signal directly to one of said outputs.

13. A circuit responsive to an audio program signal and a plurality of control signals respectively representing desired amplitudes of reproduction of said audio program at a plurality of spaced points, for deriving a plurality of versions of said audio program signal having substantially the same wave form but with respective amplitudes corresponding to respective ones of said control signals, said circuit comprising a plurality of control amplifiers, each adapted to be supplied with said audio program signal, means for producing a unidirectional bias corresponding in amplitude to the amplitude of each of said control signals, means for controlling the gain of each of said amplifiers by a respective one of said biases whereby the audio program signal output from each said amplifier has an amplitude corresponding to the amplitude of a respective one of said control signals, and means for causing at least one of said program signal outputs to be rendered independent of said control signal, said last means comprising means for producing a composite bias corresponding to said combination of said first biasses, a relay, means for energizing said relay in response to values of said combined bias below a predetermined level, and circuit means operated by said relay for interrupting the output circuits of said control amplifiers and for supplying said first-named audio program signal directly to one of said outputs.

14. A circuit as in claim 13 wherein said circuit means comprises means responsive to energization of said relay for suppressing said audio program signals from all of said control amplifier outputs and for connecting the output of one of said control amplifiers to a source of said audio program signal independent of said control amplifiers.

References Cited in the file of this patent

UNITED STATES PATENTS

| | | |
|---|---|---|
| 2,116,314 | Jenkins et al. | May 3, 1938 |
| 2,207,249 | Goldsmith | July 9, 1940 |
| 2,298,618 | Garity et al. | Oct. 13, 1942 |
| 2,313,867 | Garity et al. | Mar. 16, 1943 |
| 2,361,490 | Mueller | Oct. 31, 1944 |
| 2,499,587 | Kellogg | Mar. 7, 1950 |